(12) United States Patent
Wehner et al.

(10) Patent No.: US 7,699,346 B2
(45) Date of Patent: Apr. 20, 2010

(54) FORCE REDISTRIBUTING SYSTEM FOR A VEHICLE IN THE EVENT OF A REAR IMPACT

(75) Inventors: Timothy J Wehner, Wyandotte, MI (US); Ted Thelen, Ann Arbor, MI (US); Dave Skilton, Farmington Hills, MI (US); Thomas Cowing, Plymouth, MI (US); Apurva N Kapadia, Ahmedabad (IN)

(73) Assignee: Chrysler Group LLC, Auburn Hills, MI (US)

(*) Notice: Subject to any disclaimer, the term of this patent is extended or adjusted under 35 U.S.C. 154(b) by 393 days.

(21) Appl. No.: 11/087,407

(22) Filed: Mar. 23, 2005

(65) Prior Publication Data
US 2006/0214414 A1 Sep. 28, 2006

(51) Int. Cl.
*B62D 21/015* (2006.01)
(52) U.S. Cl. .................... 280/784; 296/187.11
(58) Field of Classification Search ........... 280/784; 296/187.03, 187.11, 189, 203.4; 180/232
See application file for complete search history.

(56) References Cited

U.S. PATENT DOCUMENTS

| | | | |
|---|---|---|---|
| 3,520,552 A * | 7/1970 | Graham et al. ............... 280/784 |
| 3,540,768 A * | 11/1970 | Peters ......................... 293/135 |
| 3,590,936 A * | 7/1971 | Wessells et al. .............. 180/312 |
| 3,848,886 A * | 11/1974 | Feustel et al. ................ 280/784 |
| 3,860,258 A * | 1/1975 | Feustel et al. ................ 180/312 |
| 3,883,166 A * | 5/1975 | Cadiou ........................ 293/133 |
| 3,912,295 A * | 10/1975 | Eggert, Jr. .................... 280/784 |
| 4,090,721 A * | 5/1978 | Wedin et al. ................. 280/834 |
| 4,440,435 A * | 4/1984 | Norlin .................... 296/187.09 |
| 4,579,367 A * | 4/1986 | Manning ...................... 280/784 |
| 4,767,038 A * | 8/1988 | McVicar ...................... 224/505 |
| 4,796,841 A * | 1/1989 | Baker et al. .................... 248/60 |
| 5,042,837 A * | 8/1991 | Kleinschmit et al. ......... 280/784 |
| 5,048,888 A * | 9/1991 | Willy et al. ............. 296/187.03 |
| 5,110,177 A * | 5/1992 | Akio ...................... 296/187.11 |
| 5,429,388 A * | 7/1995 | Wheatley et al. ............. 280/784 |
| 5,445,404 A * | 8/1995 | Shida et al. ............ 280/124.116 |
| 5,496,067 A * | 3/1996 | Stoll et al. .................... 280/784 |
| 5,560,651 A * | 10/1996 | Kami et al. ................... 280/788 |
| 5,685,599 A * | 11/1997 | Kitagawa ..................... 296/204 |
| 5,794,979 A * | 8/1998 | Kasuga et al. ................ 280/834 |
| 5,853,195 A * | 12/1998 | Le et al. ....................... 280/784 |
| 5,855,394 A * | 1/1999 | Horton et al. ................ 280/781 |
| 6,022,069 A * | 2/2000 | Birkwald et al. ............. 296/204 |
| 6,042,071 A * | 3/2000 | Watanabe et al. ............ 248/313 |
| 6,109,654 A * | 8/2000 | Yamamoto et al. .......... 280/784 |
| 6,131,685 A * | 10/2000 | Sakamoto et al. ............ 180/232 |

(Continued)

*Primary Examiner*—Paul N. Dickson
*Assistant Examiner*—Timothy Wilhelm
(74) *Attorney, Agent, or Firm*—Ralph E. Smith

(57) ABSTRACT

A force redistributing system operably attached to a vehicle. The system includes a first cross-car member, a first side load distributor and a second side load distributor. The first and second side load distributors are parallel to and spaced apart from each other and are attached at respective first ends to opposing ends of the first cross-car member. The system includes a second cross-car member having opposing ends, which are attached to second ends of the first and second side load distributors. The system establishes cross vehicle loading of force from a rear impact wherein the force from the rear impact on the vehicle is transferred along an upper path and a lower path.

19 Claims, 11 Drawing Sheets

U.S. PATENT DOCUMENTS

| | | | |
|---|---|---|---|
| 6,354,654 B2 * | 3/2002 | Lee | 296/204 |
| 6,672,620 B2 * | 1/2004 | Kawazu et al. | 280/834 |
| 6,722,696 B2 * | 4/2004 | Sonomura et al. | 280/784 |
| 6,733,040 B1 * | 5/2004 | Simboli | 280/800 |
| 6,739,557 B2 * | 5/2004 | Kato | 248/58 |
| 6,758,300 B2 * | 7/2004 | Kromis et al. | 180/309 |
| 6,824,168 B2 * | 11/2004 | Kawazu et al. | 280/834 |
| 6,830,287 B1 * | 12/2004 | Aghssa et al. | 296/187.11 |
| 6,866,115 B2 * | 3/2005 | Miyasaka | 180/311 |
| 6,866,277 B2 * | 3/2005 | Ziech et al. | 280/124.116 |
| 6,880,663 B2 * | 4/2005 | Fujiki et al. | 180/232 |
| 6,923,474 B2 * | 8/2005 | Frasch et al. | 280/784 |
| 6,926,350 B2 * | 8/2005 | Gabbianelli et al. | 296/203.01 |
| 6,942,262 B2 * | 9/2005 | Glasgow et al. | 293/132 |
| 6,951,366 B2 * | 10/2005 | Tomita | 296/187.08 |
| 7,014,007 B2 * | 3/2006 | Iwamoto | 180/311 |
| 7,032,961 B2 * | 4/2006 | Matsuda | 296/204 |
| 7,063,355 B2 * | 6/2006 | Hashimura | 280/830 |
| 7,097,235 B2 * | 8/2006 | Yasukouchi et al. | 296/187.03 |
| 7,264,277 B2 * | 9/2007 | Ono et al. | 280/830 |
| 2001/0030450 A1 * | 10/2001 | Miyasaka | 296/204 |
| 2003/0042057 A1 * | 3/2003 | Kawazu et al. | 180/69.4 |
| 2003/0057348 A1 * | 3/2003 | Arciero et al. | 248/610 |
| 2003/0094803 A1 * | 5/2003 | Fujiki et al. | 280/784 |
| 2003/0106735 A1 * | 6/2003 | Bovio | 180/309 |
| 2003/0155169 A1 * | 8/2003 | Kromis et al. | 180/309 |
| 2004/0195865 A1 * | 10/2004 | Tomita | 296/203.04 |
| 2005/0073174 A1 * | 4/2005 | Yamaguchi et al. | 296/203.04 |
| 2005/0082878 A1 * | 4/2005 | Yamada et al. | 296/204 |

* cited by examiner

FORCE REDISTRIBUTING SYSTEM FOR A VEHICLE IN THE EVENT OF A REAR IMPACT

FIELD OF THE INVENTION

This invention relates generally to a system to redistribute force from a rear impact on a vehicle. In particular, the invention relates to transferring the energy from a rear impact on a vehicle along a lower path and an upper path in the vehicle.

BACKGROUND OF THE INVENTION

Mobile vehicles are typically equipped with rear bumper systems to absorb the force from rear end impacts. Some of the force is transferred from the bumpers to the rails of the underbody in the vehicle. When the rear impact is non-symmetric, the force is unevenly distributed between the sides of the vehicles. Offset loading of the impact force occurs when the impact is not centered on the rear bumper. Symmetric loading of the impact force occurs when the impact is centered on the rear bumper.

The U.S. Pat. No. 4,090,721 impact specifications require the rear portion of a vehicle aft of the end of the rear axle system 110 to crush, which upsets the rear floor and third row seat stability. In the event of a rear impact to the vehicle, the floor in the rear of the vehicle can be crushed pushing the seat structure upward and rearward. If the impact is forceful enough, the door openings of the vehicle can be deformed so that one or more doors cannot be opened normally. Rear impacts can also affect the vehicle fuel system and displace a spare tire stored under the vehicle body.

An apparatus to protect fuel tanks in the event of a rear collision is described in U.S. Pat. No. 4,090,721 of Wedin, et al. Wedin et al. anticipated that their described apparatus, herein called the Wedin apparatus, would satisfy the standards, which were in place in 1976 when the Wedin patent application was filed. The impact test standards have been modified since to 1976 to more rigorous impact tests that the Wedin apparatus would be unable to pass.

Specifically, the Wedin apparatus has no cross-car member to distribute force from a rear impact to both sides of the struck vehicle. The Wedin apparatus does not protect against door opening closure, and it does not stabilize the rear floor of an impacted vehicle. The Wedin apparatus does not provide force distribution of off-center rear impacts.

It is desirable to distribute the force from an off-center rear impact between both sides of the impacted vehicle. It is further desirable to distribute the force from a rear impact on a vehicle along more than one path. It is also desirable to stabilize a rear floor having seat attachments for seating in a second and third row.

SUMMARY OF THE INVENTION

Accordingly, a first aspect of the present invention provides a force redistributing system operably attached to a vehicle. The system includes a first cross-car member, a first side load distributor and a second side load distributor. The first and second side load distributors are parallel to and spaced apart from each other and are attached at respective first ends to opposing ends of the first cross-car member. The system includes a second cross-car member having opposing ends, which are attached to second ends of the first and second side load distributors. The system establishes cross vehicle loading of force from a rear impact wherein the force from the rear impact on the vehicle is transferred along an upper path and a lower path.

A second aspect of the present invention provides a force redistributing system for a vehicle including means for distributing force from a rear impact on the vehicle along an upper path and a lower path.

A third aspect of the present invention provides a force redistributing system operably attached to a vehicle. The system includes a first cross-car member, a first side load distributor, a second side load distributor, rear rails, a second cross-car member, a first rear bridge bracket, a second rear bridge bracket, a first fore-bridge bracket and a second fore-bridge bracket. The first cross-car member has a first end and a second end. The first side load distributor includes a first inner member and a first outer member and has a first end and a second end. The first end of the first side load distributor is attached to the first end of the first cross-car member. The second side load distributor includes a second inner member and a second outer member and has a first end and a second end. The first end of the second side load distributor is attached to the second end of the first cross-car member. The second side load distributor is parallel to and spaced apart from the first side load distributor. The rear rails of the vehicle are operably attached to the first and the second side load distributors. The second cross-car member has opposing ends, which are attached to the second ends of the first and second side load distributors. The first rear bridge bracket interconnects the first end of the first cross-car member, the first inner member and the first outer member. The second rear bridge bracket interconnects the second end of first cross-car member, the second inner member, and the second outer member. The first fore-bridge bracket interconnects the first side load distributor, the second cross-car member, and a body of the vehicle, while the second fore-bridge bracket connects the second cross-car member and the second outer member of the second side load distributor at the second end, and a body of the vehicle. The system establishes cross vehicle loading of force from a rear impact and the force from the rear impact is distributed along an upper path and a lower path of the vehicle.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

In the following description, several well-known features of a vehicle underbody, a vehicle exterior body, an exhaust system, a fuel system and a rear chassis and rear axle system are not shown or described so as not to obscure the present invention.

Figure 1:
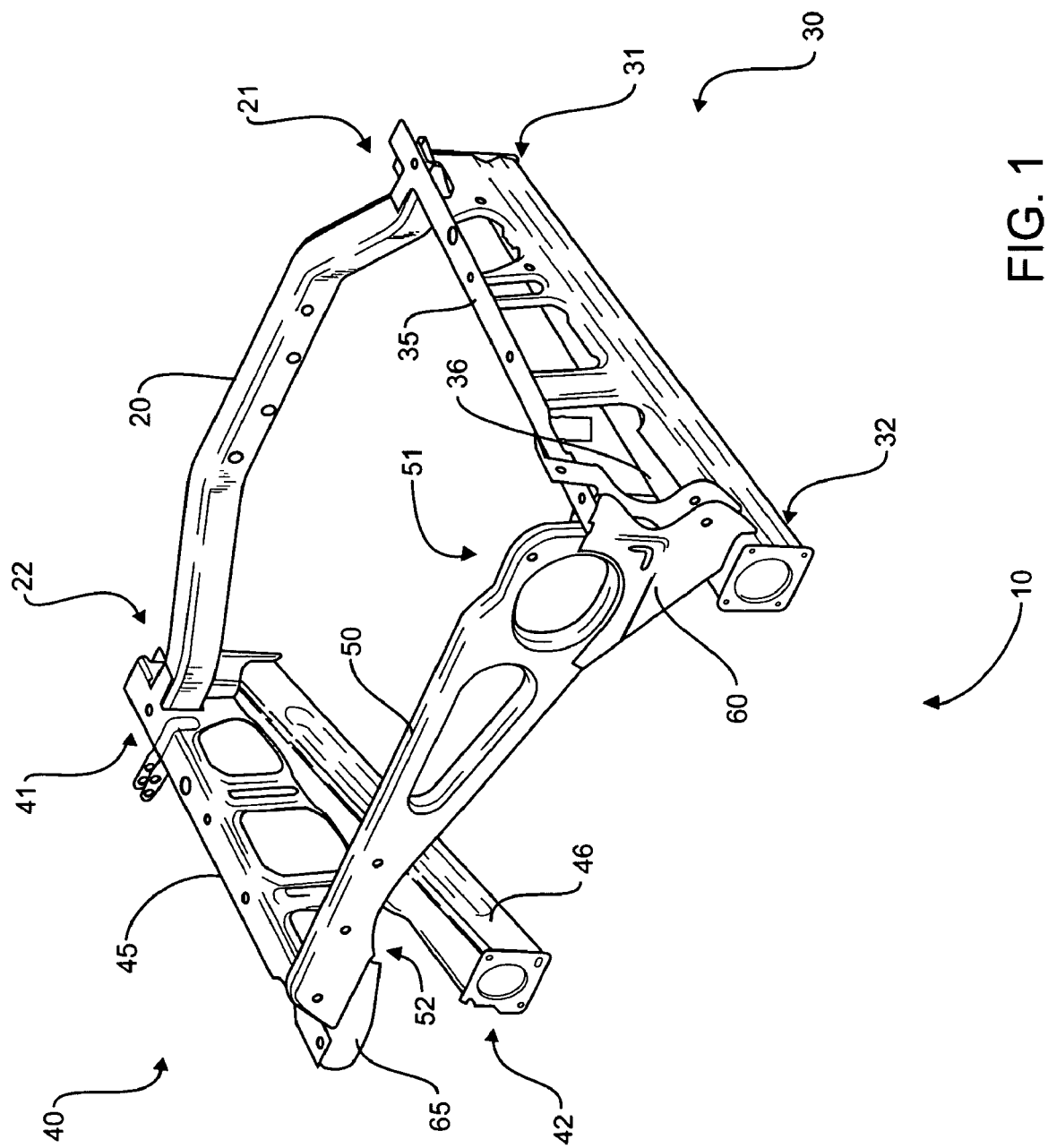
FIGS. 1 and 2 illustrate a first and a second isometric view, respectively, of an exemplary embodiment of a portion of the force redistributing system in accordance with the present invention.
Figure 2:
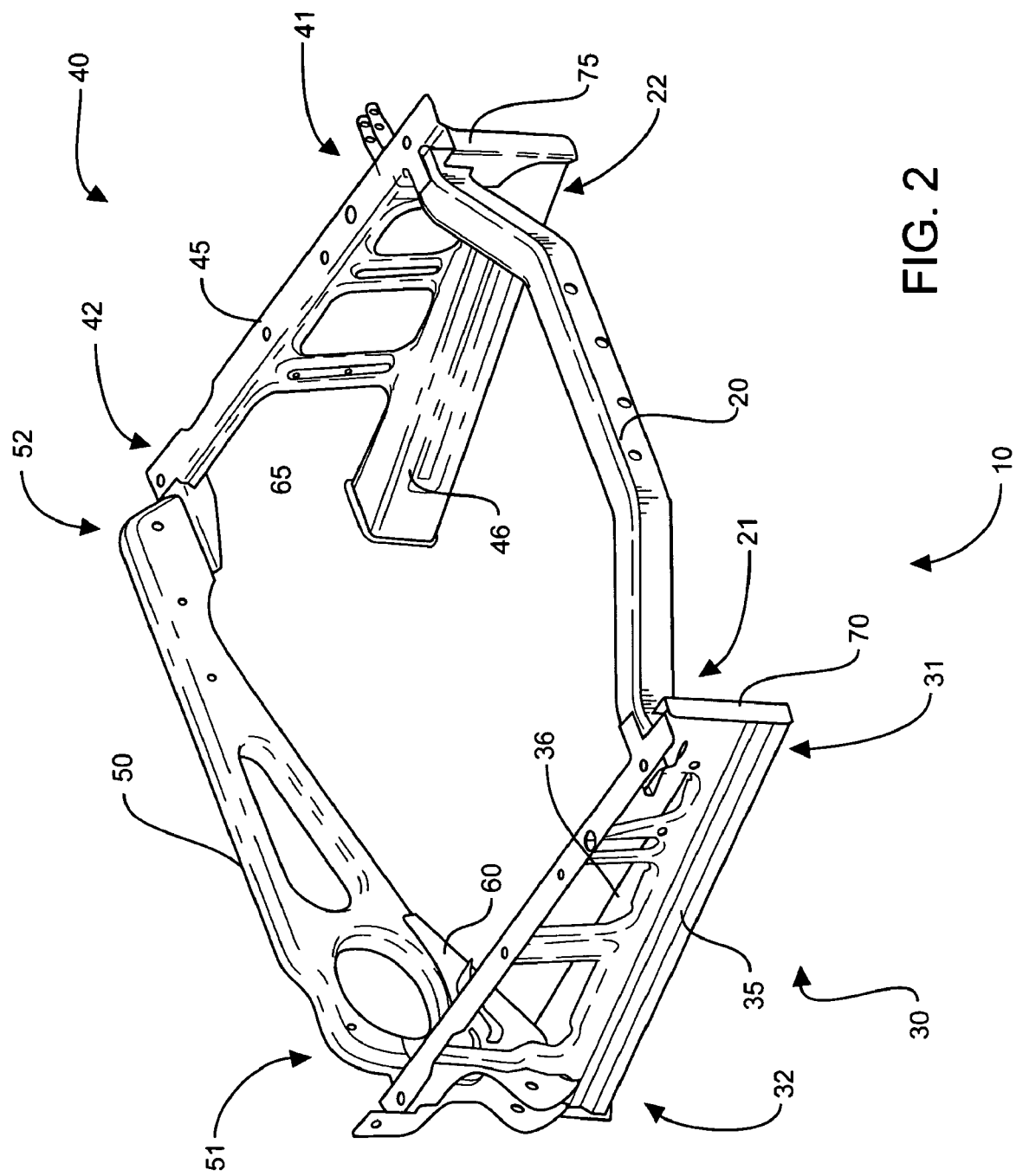

Referring now to the drawings, FIGS. 1 and 2 illustrate a first and a second isometric view, respectively, of an exemplary embodiment of an apparatus 10 of the force redistributing system 9 (FIG. 3) in accordance with the present invention. FIG. 1 illustrates a front isometric view and FIG. 2 illustrates a rear isometric view of the apparatus 10 of the force redistributing system 9. The force redistributing system 9 includes rear rails of an underbody of a vehicle 5 (FIGS. 3 and 4) having an exterior body. Throughout this document the terms force and load are used interchangeably.

The apparatus 10 includes a first cross-car member 20, a first side load distributor 30, a second side load distributor 40, and a second cross-car member 50. The first cross-car member 20 has a first end 21 and a second end 22. The first side load distributor 30 has a first end 31 and a second end 32 and includes a first inner member 36 and a first outer member 35. The first end 31 of the first side load distributor 30 is attached to the first end 21 of the first cross-car member 20.

The second side load distributor 40 has a first end 41 and a second end 42 and includes a second inner member 46 and a second outer member 45. The first end 41 is attached to the second end 22 of the first cross-car member 20. The second side load distributor 40 is substantially parallel to and spaced apart from the first side load distributor 30.

The second cross-car member 50 has opposing ends 51 and 52 attached to respective second ends 32 and 42 of the first and second side load distributors 30 and 40. A first rear bridge bracket 70 (FIG. 2) interconnects the first end 21 of the first cross-car member 20, the first inner member 36 and the first outer member 35. A second rear bridge bracket 75 (FIG. 2) interconnects the second end 22 of first cross-car member 20, the second inner member 46, and the second outer member 45. The first rear bridge bracket 70 and the second rear bridge bracket 75, thus, fixedly secure the first cross-car member 20 to the first side load distributor 30 and the second side load distributor 40.

A first fore-bridge bracket 60 interconnects the first side load distributor 30, at second end 32 with the second cross-car member 50 at the first end 51 and with the body of the vehicle. A second fore-bridge bracket 65 connects the second outer member 45 of the second side load distributor 40 at the second end 42 with the second end 52 of second cross-car member 50. The second fore-bridge bracket 65 is also connected with the body of the vehicle. The first fore-bridge bracket 60 and the second fore-bridge bracket 65, thus, fixedly secure the second cross-car member 50 with the first side load distributor 30 and the second side load distributor 40.

The second cross-car member 50, the first side load distributor 30, and second side load distributor 40 have feature holes, in one embodiment, to reduce the weight of the components. The geometric shapes and the placements of feature holes in the second cross-car member 50, the first side load distributor 30, and second side load distributor 40 are designed to provide strength, in one embodiment, as is known to those of skill in the art. The geometric shape of first cross-car member 20 is designed, in one embodiment, to provide strength as is known to those of skill in the art. The first cross-car member 20 is suitable for trail hitch adaptation, in one embodiment.

The material of each component of the apparatus 10 has desirable performance characteristics, such as strength, resistance to deformation, resistance to corrosion, and other characteristics. In one embodiment, the components of the apparatus 10 of the force redistributing system including the first cross-car member 20, the first side load distributor 30, the second side load distributor 40, the second cross-car member 50, the first rear bridge bracket 70, the second rear bridge bracket 75, the first fore-bridge bracket 60 and the second fore-bridge bracket 65 are made of metals such as steel, aluminum or alloys of metal.

Figure 3:
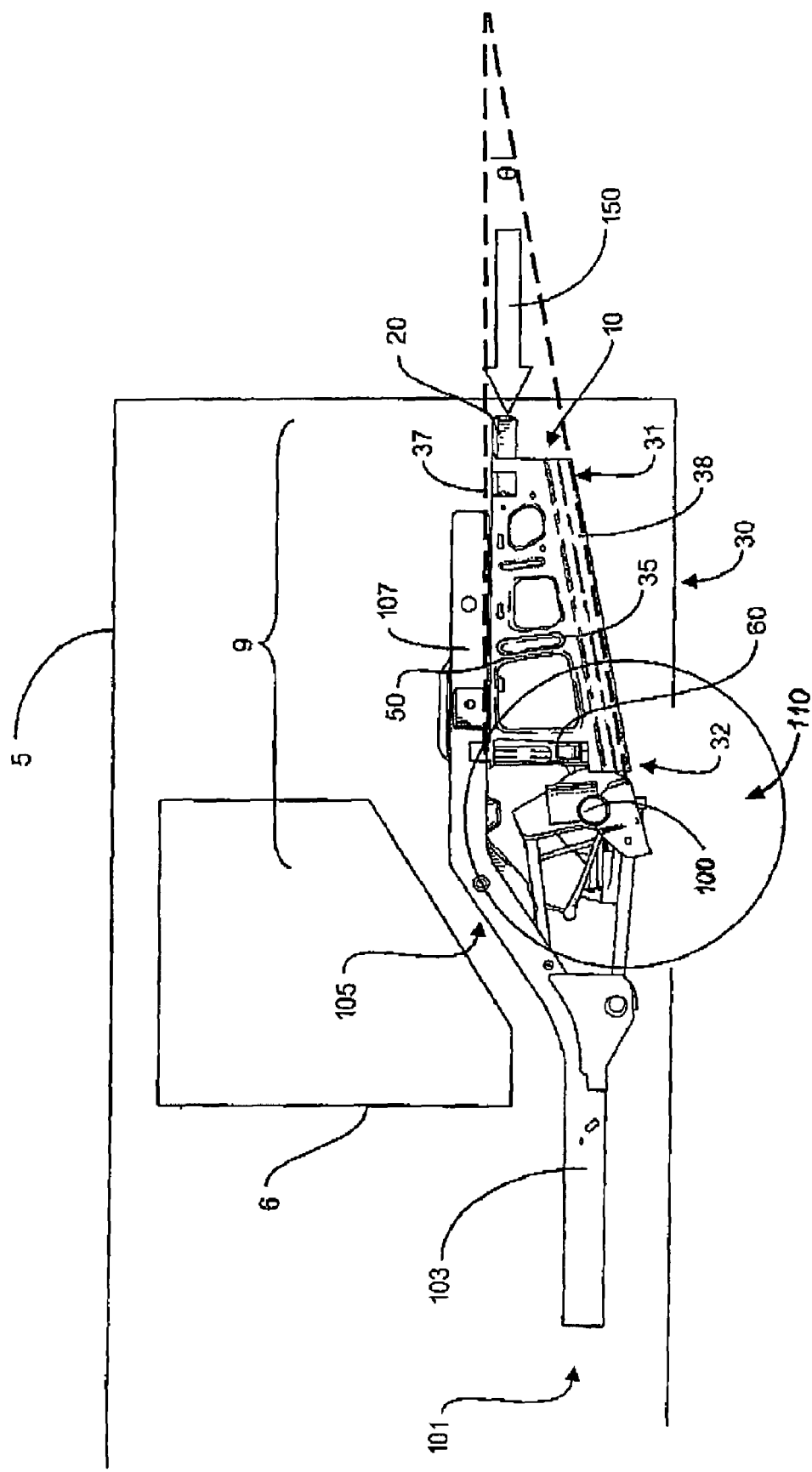
FIGS. 3 and 4 illustrate a side view and a top view, respectively, of the force redistributing system, a rear axle system, chassis components and rail systems in accordance with the present invention.
Figure 4:
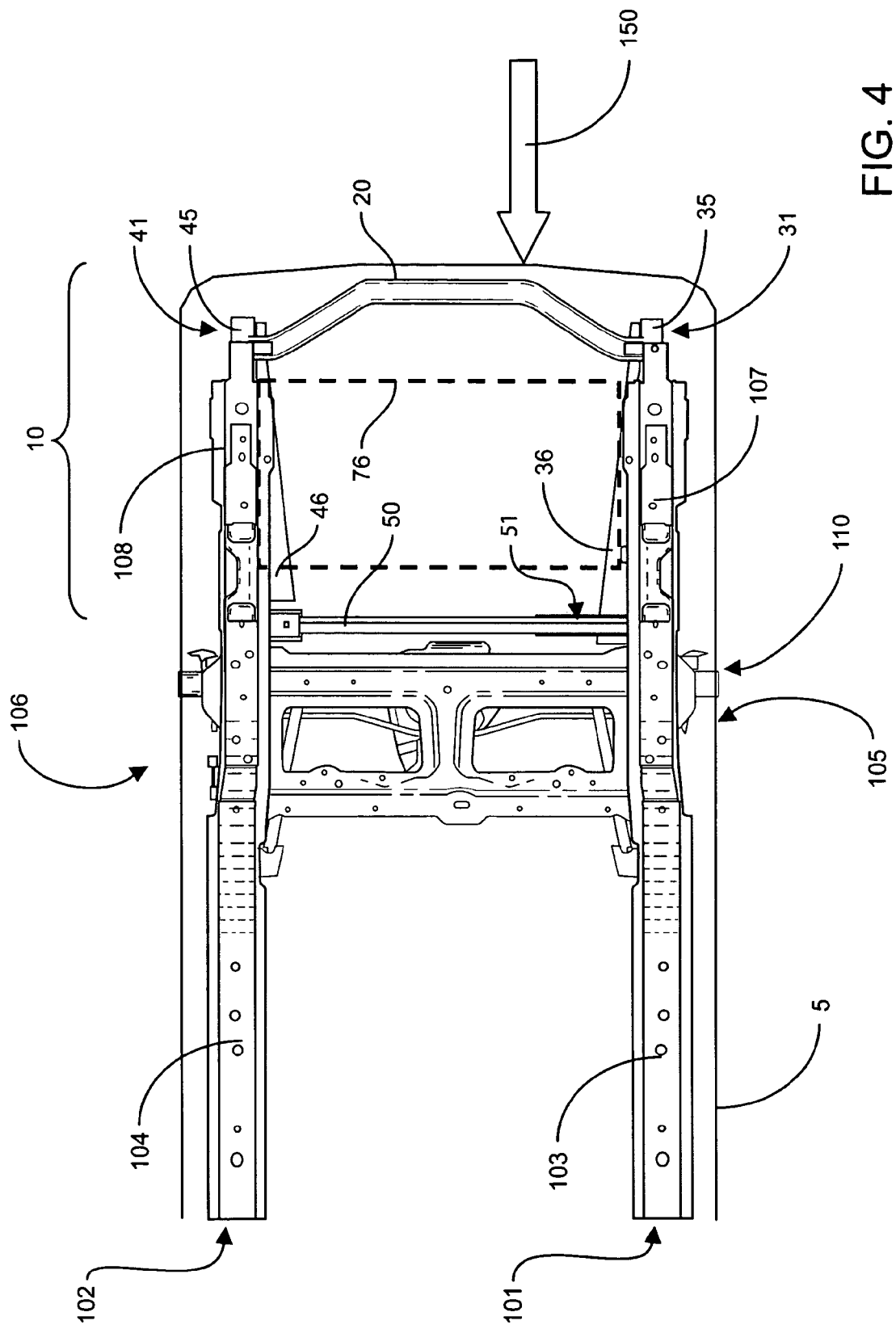

FIGS. 3 and 4 illustrate a side view and a top view, respectively, of the force redistributing system 9, a rear axle system 110 and rail systems 101 and 102 in accordance with the present invention. A rear portion of a vehicle 5 is outlined to indicate a generic external body and tire of the vehicle in relation to the force redistributing system 9. In FIG. 3, the outline of a rear door 6 is outlined on the side of the vehicle 5. The outline of vehicle 5 is not to scale and is not intended to limit the vehicle type or shape for which the force redistributing system 9 can be designed.

The force redistributing system 9 includes the rear rails 107 and 108 positioned in the rear vehicle underbody of the vehicle 5 and the apparatus 10 described above with reference to FIGS. 1 and 2. Rail system 101 includes mid-rail 103, rail kick-up 105, rear rail 107 and other rails (not shown) as known to those of skill in the art. Rail system 102 includes mid-rail 104, rail kick-up 106, rear rail 108 and other rails (not shown), as known to those of skill in the art. The rail systems 101 and 102 are connected to vehicle 5 as is known to those of skill in the art. The rail kick-up 105 and rail kick-up 106 are positioned forward of the axis of rotation 100 of the rear wheels and accommodate the rear axle system package, as shown in FIG. 3. Rear rail 107 and rear rail 108 are substantially parallel to each other and lie in a first plane. Mid-rail 103 and mid-rail 104 are substantially parallel to each other and lie in a second plane, which is substantially parallel to and offset from the first plane. In one embodiment, the rail systems 101 and 102 are welded, using an appropriate technique, to a body of a unibody vehicle. In another embodiment, the rail systems 101 and 102 are bolted to the body of a frame vehicle. In yet another embodiment, the rail systems 101 and 102 have the shape of an upside down U over the rear axle system 110.

The rear axle system 110 is connected to the rail systems 101 and 102 at the mid-rails 103 and 104, respectively, and rail kick-ups 105 and 106, respectively. The apparatus 10 of the force redistributing system 9 is connected to the rear rails 107 and 108 of rail systems 101 and 102, respectively.

The first inner member 36 is attached to the side of first outer member 35 that faces inwardly to the vehicle 5 along the bottom edge 38 (FIG. 3) of the first outer member 35. First inner member 36 angles inwardly to the vehicle 5 as is visible in FIG. 4. Only the first end 31 of the of the first outer member 35 is visible in FIG. 4 since the rear rail 107 extends parallel to and above most of the first outer member 35.

Figure 5:
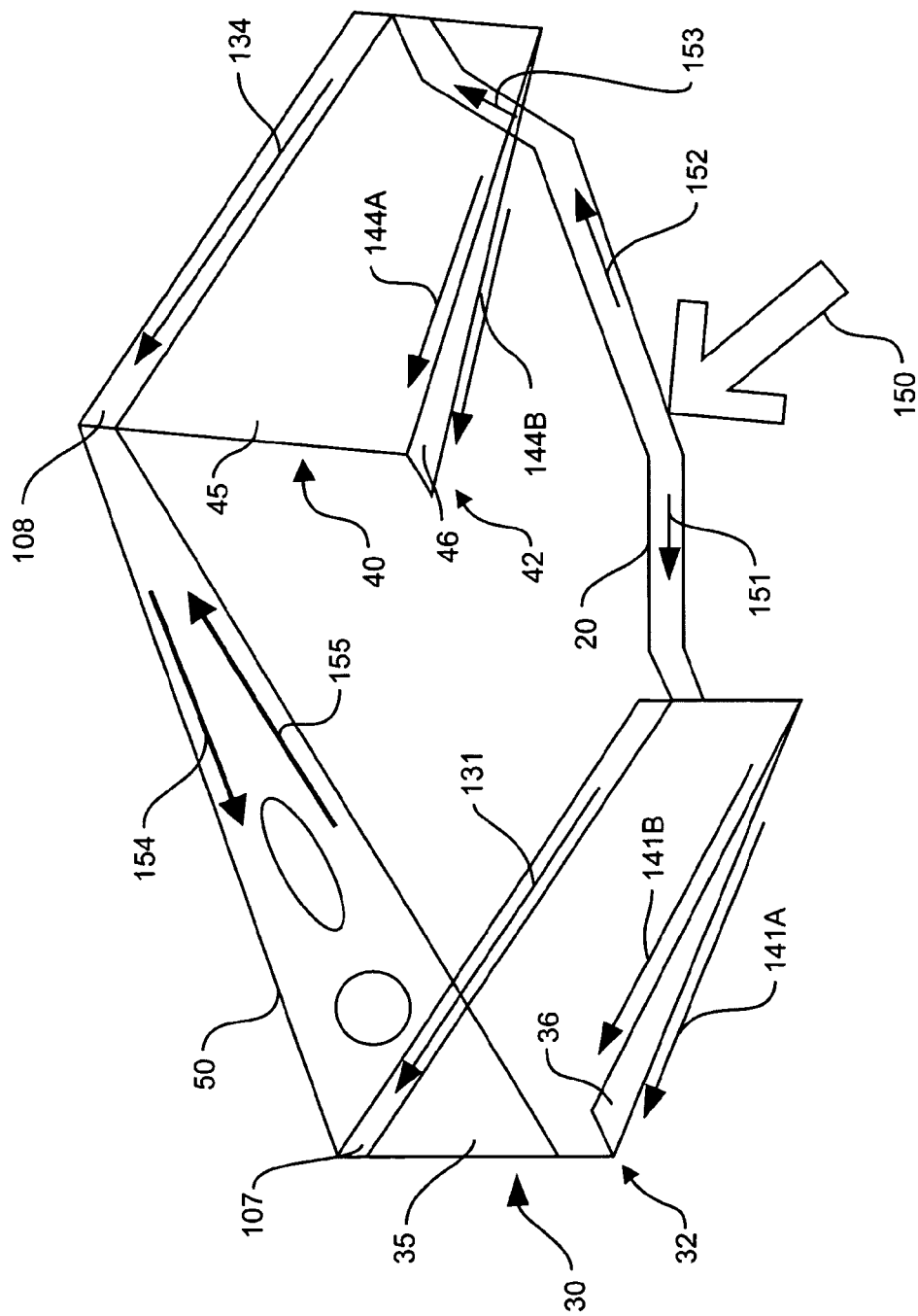
FIG. 5 illustrates an isometric view of a schematic line diagram of the force transfer paths in the event of a rear impact on a vehicle in accordance with the present invention.
Figure 6:
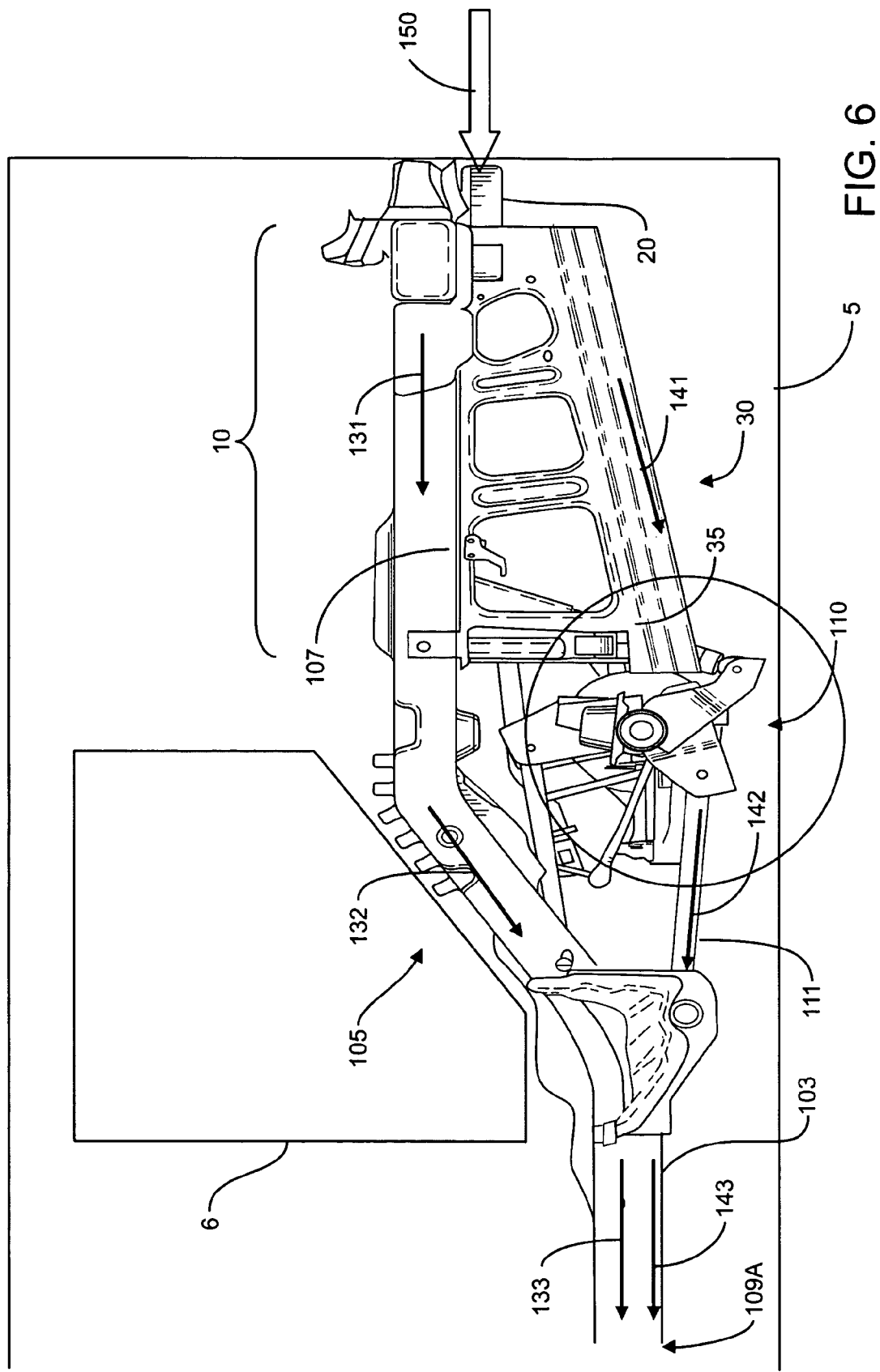
FIGS. 6 and 7 illustrate schematic diagrams in a first and a second side view, respectively, of the force transfer paths in the event of a rear impact on a vehicle in accordance with the present invention.

The rear rail 107 is operably attached to the first outer member 35 of the first side load distributor 30 to distribute and transfer force from a rear impact on the vehicle 5 along an upper path and a lower path (FIGS. 5 and 6). The first end 51 of the second cross-car member 50 is also attached to the rear rail 107. The first fore-bridge bracket 60 is attached to the first outer member 35 at the second end 32.

Figure 7:
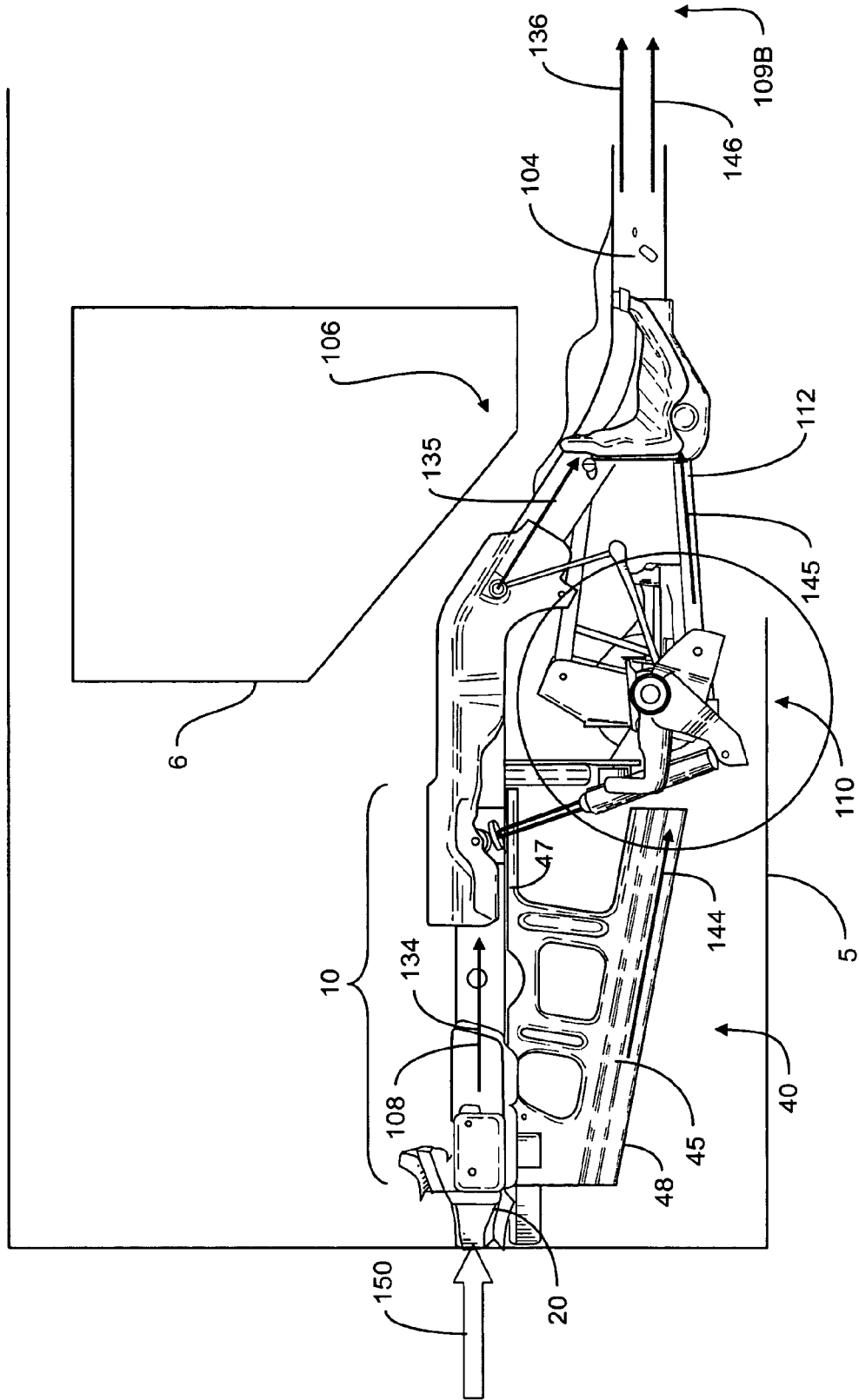

The second inner member 46 is attached to the side of the second outer member 45 along the bottom edge 48 (FIG. 7). Second inner member 46 angles inwardly to the vehicle 5 as is visible in FIG. 4. Only the first end 41 of the of the first outer member 45 is visible in FIG. 4 since the rear rail 108 extends parallel to and above most of the first outer member 45. The rear rail 108 is operably attached to the second outer member 45 of the second side load distributor 40 to distribute and transfer force from a rear impact 150 in the direction indicated by block arrow on the vehicle along an upper path and a lower path (FIGS. 5 and 7). The force redistributing system 9 establishes cross vehicle loading of force from a rear impact 150.

The first outer member 35 and the second outer member 45 operably connect the first cross-car member 20 to rear rails 107 and 108, respectively, of the vehicle 5 to provide a load path. The load path is the path that the force from the rear impact 150 travels in the vehicle 5. The term load path is used interchangeably with the term force transfer path in this document. The rear impact 150 is indicated by the block arrow, in which the position of maximum impact on the vehicle 5 is represented by the position of the arrow-head of the block arrow. Area 76 (FIG. 4) is indicated with dashed lines to generally show a location in which anchor points for a third row seat assembly can be attached to the vehicle underbody (not shown). The directing of the force to chassis components stabilizes the anchor points within this area 76.

Regarding FIG. 3, the first side load distributor 30 is seen to have a top edge 37 and a bottom edge 38. Top edge 37 and bottom edge 38 are non-parallel and subtend an angle θ. The non-parallel top edge 47 (FIG. 7) and bottom edge 48 (FIG. 7) of second side load distributor 40 also subtend an angle θ. Angle θ provides clearance for the vehicle body when driving over obstacles, such as rocks, in off-road driving. In one embodiment, θ is approximately 10.5 degrees. In another embodiment, the angle θ is within a range from about 5 degrees to 15 degrees.

FIG. 5 illustrates an isometric view of a schematic line diagram of the force transfer paths in the event of a rear impact 150 on a vehicle 5 in accordance with the present invention. In FIG. 5, the force-redistributing system 9 is shown as a line diagram for clarity of illustration. Arrows in FIGS. 5-7 are schematically used to illustrate the direction of the force transfer. The arrows are not vectors since the length of the arrows is not indicative of the amplitude of the represented force.

The rear impact 150 is represented as a block arrow and the region of maximum impact on the vehicle 5 is where block arrow touches the first cross-car member 20. The rear impact 150 can be input at any point on the assembly 10 including points below the first cross-car member 20. For example, the rear impact can be on the first rear bridge bracket 70, the second rear bridge bracket 75 or the first ends 31 and 41 of the first and second side load distributors 30 and 40, respectively.

The first cross-car member 20 is operable as a lateral load distributor for offset and symmetric loading of the force from the rear impact 150. The force redistributing system 9 establishes cross vehicle loading of force from a rear impact 150 as shown schematically by arrows 151, 152 and 153. As shown in FIG. 5, the rear impact 150 is an off-center rear impact and the first cross-car member 20 transfers a first portion of the force, shown as arrow 151, to the first side load distributor 30 and a second portion of the force, shown as arrows 152 and 153, to the second side load distributor 40.

The force from the rear impact 150 is distributed along the first cross-car member 20 to the passenger side of the vehicle 5 as indicated by arrows 152 and 153. The force from arrow 153 is then transferred as arrow 134 to the upper path and, subsequently, as arrows 144A and 144B to the lower path.

The upper path on the passenger side includes rear rail 108. The lower path on the passenger side is distributed into two paths. A portion of the lower path on the passenger side includes the second outer member 45 (FIGS. 1 and 2) of the second side load distributor 40, which transfers the force of arrow 144A. A portion of the lower path on the passenger side includes the second inner member 46 (FIGS. 1 and 2) of the second side load distributor 40, which transfers the force of arrow 144B.

While the force from the rear impact 150 is distributed along the first cross-car member 20 to the passenger side of the vehicle 5, the force from the rear impact 150 is also distributed along the first cross-car member 20 to the driver side of the vehicle 5 as indicated by arrow 151. The force from arrow 151 is then transferred as arrow 131 to the upper path and, subsequently, as arrows 141A and 141B to the lower path.

The upper path on the driver side includes rear rail 107. The lower path on the driver side is distributed into two paths. A portion of the lower path on the driver side includes the first outer member 35 (FIGS. 1 and 2) of the first side load distributor 30, which transfers the force of arrow 141A. A portion of the lower path on the driver side includes the first inner member 36 (FIGS. 1 and 2) of the first side load distributor 30, which transfers the force of arrow 141B.

The force redistributing system 9 establishes cross vehicle loading of force from a rear impact 150 via the second cross-car member 50 as shown schematically by arrows 154 and 155. The second cross-car member 50 provides lateral stability as loads develop in the first side load distributor 30 due to the forces 141A and 141B and in second side load distributor 40 due to the forces 144A and 144B. The lateral stability of the second cross-car member 50 keeps the first and second side load distributors 30 and 40 on the targeted impact areas of rear axle system 110. The second ends, 32 and 42 of side load distributors, 30 and 40, respectively, can be designed to allow, or not to allow for some crush when impacted against target points of rear axle system 110. As forces 141A, 141B develop in side load distributor 30 and as forces 144A, 144B develop in side load distributor 40, a columnar loading in addition to up/down and lateral forces is present in the side load distributors 30 and 40. The forces 151, 152, 153 cause lateral movement at second end 32 and the tension-compression forces 154 and 155 in member 50 will mitigate the tendency of second end 32 to "walk" off the intended target zone of rear axle system 110 during load whether or not second end 32 is designed for some allowable crush.

The relationship between second ends 32, 42 of side load distributors, 30 and 40, respectively, and the intended target zones on rear axle system 110 can vary since apparatus 10 is connected to the body of vehicle 10 and rear axle system 110 is divorced from the chassis system. The amount of variation is known to within a design range and is based on cargo loading, trailer hitch weight and pitching due to hard braking. The intended target zone of rear axle system 110 is within this range of variation between second ends 32, 42 of side load distributors, 30 and 40, respectively.

FIGS. 6 and 7 illustrate schematic diagrams in a first and a second side view, respectively, of the force transfer paths in the event of a rear impact 150 on a vehicle 5 in accordance with the present invention. FIGS. 6 and 7 illustrate the rear impact 150 on the vehicle 5 is transferred along the upper path and the lower path to a body-point 109A and 109B forward of the rail kick-ups 105 and 106, respectively. The force from rear impact 150 is distributed first along an upper path and then, after the side load distributors 30 and 40 contact the intended target zone of the rear axle system 110, along both an upper and a lower path.

Regarding FIG. 6, the force from the rear impact 150 is distributed along an upper path on the driver side of vehicle 5. After the impact distributed along the upper path results in contact between the side load distributor 30 and the rear axle system 110, the force from the rear impact 150 is distributed along both a lower path and the upper path. The upper path on the driver side of vehicle 5 is indicated with arrows 131, 132 and 133. The lower path on the driver side of the vehicle 5 indicated with arrows 141, 142 and 143.

The upper path on the driver side of the vehicle 5 transfers the force of arrow 131 through the rear rail 107 to the rail kick-up 105 as the force of arrow 132. The force of arrow 132 is transferred through the rail kick-up 105 in the upper path to the mid-rail 103 as the force of arrow 133.

The lower path on the driver side of the vehicle 5 transfers the force of arrow 141 through the first side load distributor 30 to the lower control arm 111 of the rear axle system 110 as the force of arrow 142. The force of arrow 142 is transferred through the lower control arm 111 to the mid-rail 103 as the force of arrow 143.

The lower path in the first side load distributor 30 transfers the force of arrow 141 in two paths shown in FIG. 5 as 141A and 141B. The force of arrow 141A is transferred to a body-point 109A forward of the rail kick-up 105 along the first outer member 35. The force of arrow 141B is transferred to a body-point 109A forward of the rail kick-up 105 along the first inner member 36.

The force from the rear impact 150 is also distributed along an upper path on the passenger side of vehicle 5. Regarding FIG. 7, the force from the rear impact 150 is distributed along an upper path on the passenger side of vehicle 5. After the impact distributed along the upper path results in contact between the second side load distributor 40 and the rear axle system 110, the force from the rear impact 150 is distributed along both a lower path and the upper path. The upper path on the passenger side of the vehicle 5 is indicated with arrows 134, 135 and 136. The lower path on the passenger side of the vehicle 5 is indicated with arrows 144, 145 and 146.

The upper path on the passenger side of the vehicle 5 transfers the force of arrow 134 through the rear rail 108 to the rail kick-up 106 as the force of arrow 135. The force of arrow 135 is transferred through the rail kick-up 106 in the upper path to the mid-rail 104 as the force of arrow 136.

The lower path on the passenger side of the vehicle 5 transfers the force of arrow 144 through the second side load distributor 40 to the lower control arm 112 of the rear axle system 110 as the force of arrow 145. The force of arrow 145 is transferred through the lower control arm 112 to the mid-rail 104 as the force of arrow 146.

The lower path in the second side load distributor 40 transfers the force of arrow 144 in two paths shown in FIG. 5 as 144A and 144B. The force of arrow 144A is transferred to a body-point 109B forward of the rail kick-up 106 along the second outer member 45. The force of arrow 144B is transferred to a body-point 109B forward of the rail kick-up 106 along the second inner member 46.

The rear axle system 110 is attached to the rail system 101 and rail system 102 via chassis components including the lower control arms 111 and 112, respectively. The vehicle 5 includes other chassis components, as known in the art. In some embodiments, the rear axle system 110 is attached to the rail system 101 and rail system 102 via other types of chassis components. The manner in which the rear axle system 110 is attached to the rail system 101 and rail system 102 depends upon the vehicle type and design.

In this manner, the force from a rear impact 150 is sequentially distributed. When the rear of the vehicle 5 receives a rear impact 150, the load is transferred via the upper path in the rear rails 107 and 108 until the side load distributors 30 and 40 contact the intended target zone of the rear axle system 110. Then, the force is redistributed and shared between the upper path and lower path. Thus, a portion of the force from the rear impact 150 is transferred into the rear axle system 110 via the side load distributors 30 and 40 and the load is shared between the upper and lower paths. The rear axle system 110 is designed to sustain the force of contact with the side load distributors 30 and 40 without breaking, cracking and/or failing.

The force transferred along the mid-rails 103 and 104 is parallel to the mid-rails 103 and 104 and therefore distortion of the vehicle doors above the mid-rails 103 and 104 and rail kick-ups 105 and 106, typically rear doors 6 (FIG. 3), is reduced. Specifically, the first inner member 36 and the second inner member 46 of the force redistributing system 9 direct the force to chassis components, including the rear axle system 110, to preserve rear door openings and to stabilize a rear portion of the vehicle underbody, specifically rail portions 103, 104, 105, 106, 107 and 108. In this manner, when the vehicle 5 is subject to the rear impact 150, the force redistributing system 9 is operable to minimize rear door opening deformation and to prevent under-ride condition.

The force redistributing system 9 includes the end of the rear rails 107 and 108 so the rear rails 107 and 108 do not require a maximum stiffness in the kick-up zones of rail kick-ups 105 and 106 as would be needed to prevent an undesirable buckle mode. In particular, the force redistributing system 9 allows for some slight rear tip crush for high speed events in order to permit energy absorption while limiting intrusion in the rear cargo area. In one embodiment, the rear cargo area includes a third row of seats, which have anchors on the floor approximately in the area 76 in FIG. 3. The force redistributing system 9 picks up the load of a rear impact 150 at the end of the vehicle 5 and accelerates the vehicle 5 forward, thereby reducing the duration of the impact. The force redistributing system 9 may be used for modern impact tests. The rigid 30 miles per hour "barn door" FMVSS 301, which predates the 2005 NPRM as an FMVSS 301 update, has been replaced with a 50 miles per hour deformable offset barrier. The rigid 30 miles per hour barrier previously used in FMVSS 301 is, however, still in place for TRIAS 33, for vehicles sold in the Japanese market. Additionally, the force redistributing system 9 is designed for managing low speed bumper damage such as the IIHS 5 mile per hour pole test and 5 mile per hour barrier test.

A lower impact point, such as an impact point on the first rear bridge bracket 70 or the second rear bridge bracket 75, can lift the rear of the vehicle 5. In this case, apparatus 10 maintains rear floor stability with a resulting stability of anchor points in an area 76 (FIG. 4) for a third row seat assembly attached to the vehicle underbody.

Figure 8:
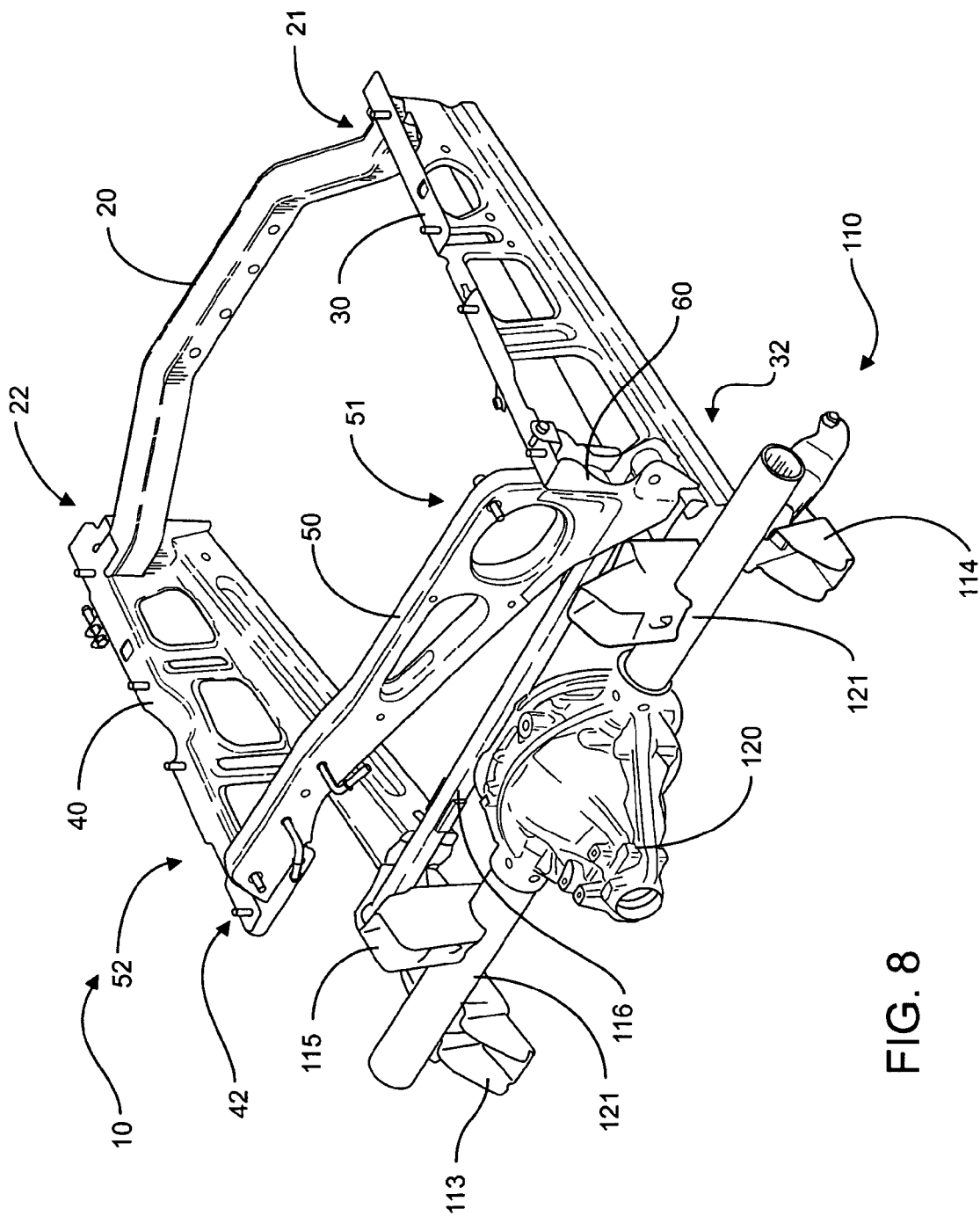
FIGS. 8 and 9 illustrate a first and a second isometric view, respectively, of an exemplary embodiment of a portion of the force redistributing system and a connected portion of a rear axle system in accordance with the present invention.
Figure 9:
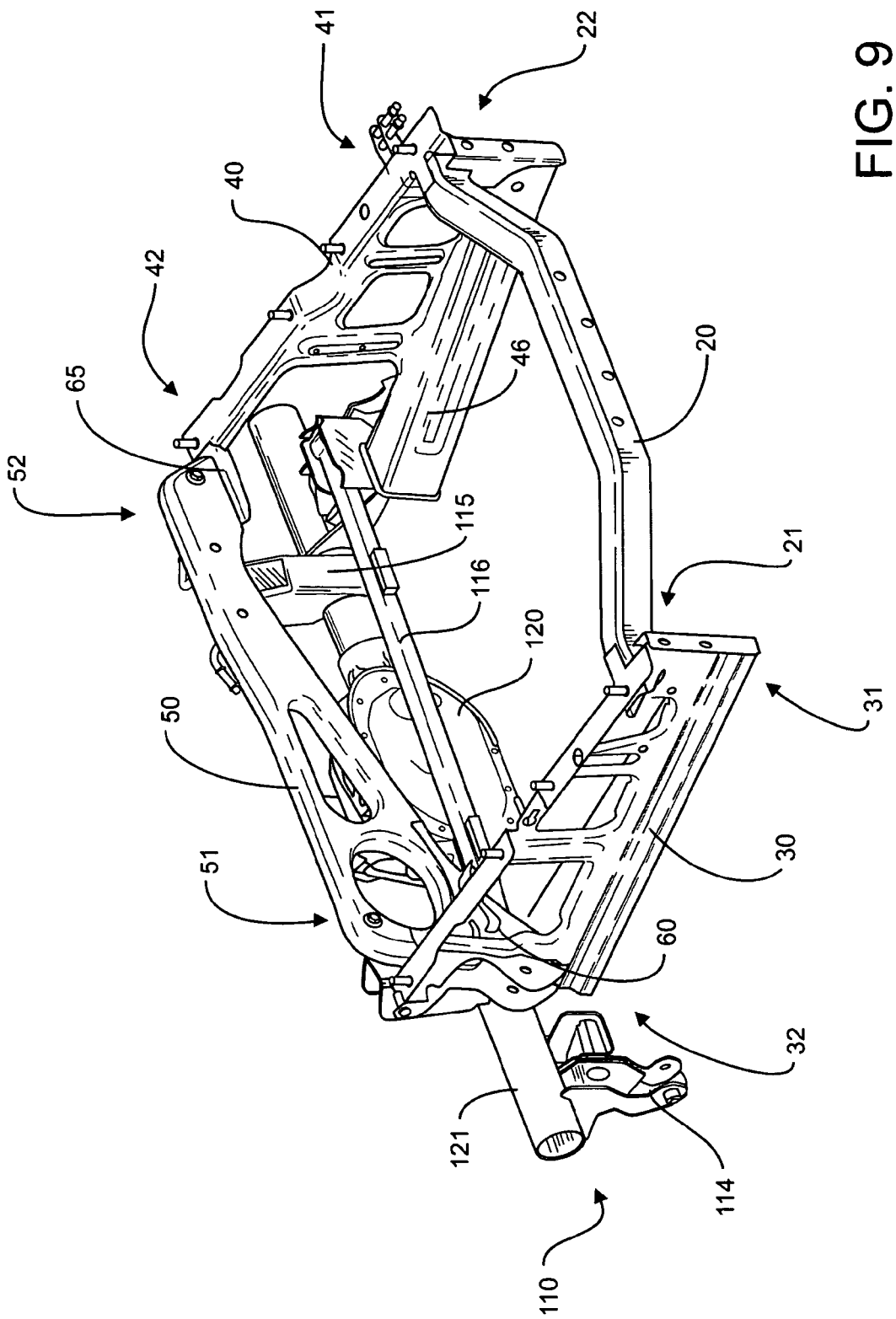

FIGS. 8 and 9 illustrate a first and a second perspective view, respectively, of an exemplary embodiment of apparatus 10 of the force redistributing system 9 and a portion of a rear axle system 110 in accordance with the present invention. The rear axle system 110 includes a rear axle 121, a rear differential 120, and a track bar member 116. The track bar member 116 is attached at one end to the first fore-bridge bracket 60 and at an opposing end to an axle attachment member 115. Axle attachment member 115 abuts an aft portion of the rear axle 121 in a semi-encircling manner. There is a gap between axle attachment member 115 and second end 42 of side load distributor 40 to allow for vehicle body 5 to rear axle 121 articulation. Likewise, axle attachment member 114 abuts a bottom portion of the rear axle 121 in a semi-encircling manner and there is a gap between axle attachment member 114 and second end 32 of side load distributor 30 to allow for vehicle body to rear axle 121 articulation.

Axle attachment member 115 is positioned between the axle attachment member 114 and axle attachment member 113 (FIG. 8). Axle attachment member 113 (FIG. 8) abuts a bottom portion of the axle 121 in a semi-encircling manner. The regions where axle attachment members, 114 and 115 abut aft portions of axle 121 in a semi-encircling manner provide the contact points between side load distributors 30 and 40 and the rear axle system 110. These regions are the intended target zone of the rear axle system 110 as described above with reference to FIGS. 6 and 7 so that, in the event of a rear impact 150, the side load distributors 30 and 40 contact the rear axle system 110 and the force load is subsequently redistributed between the upper path and lower path.

Figure 10:
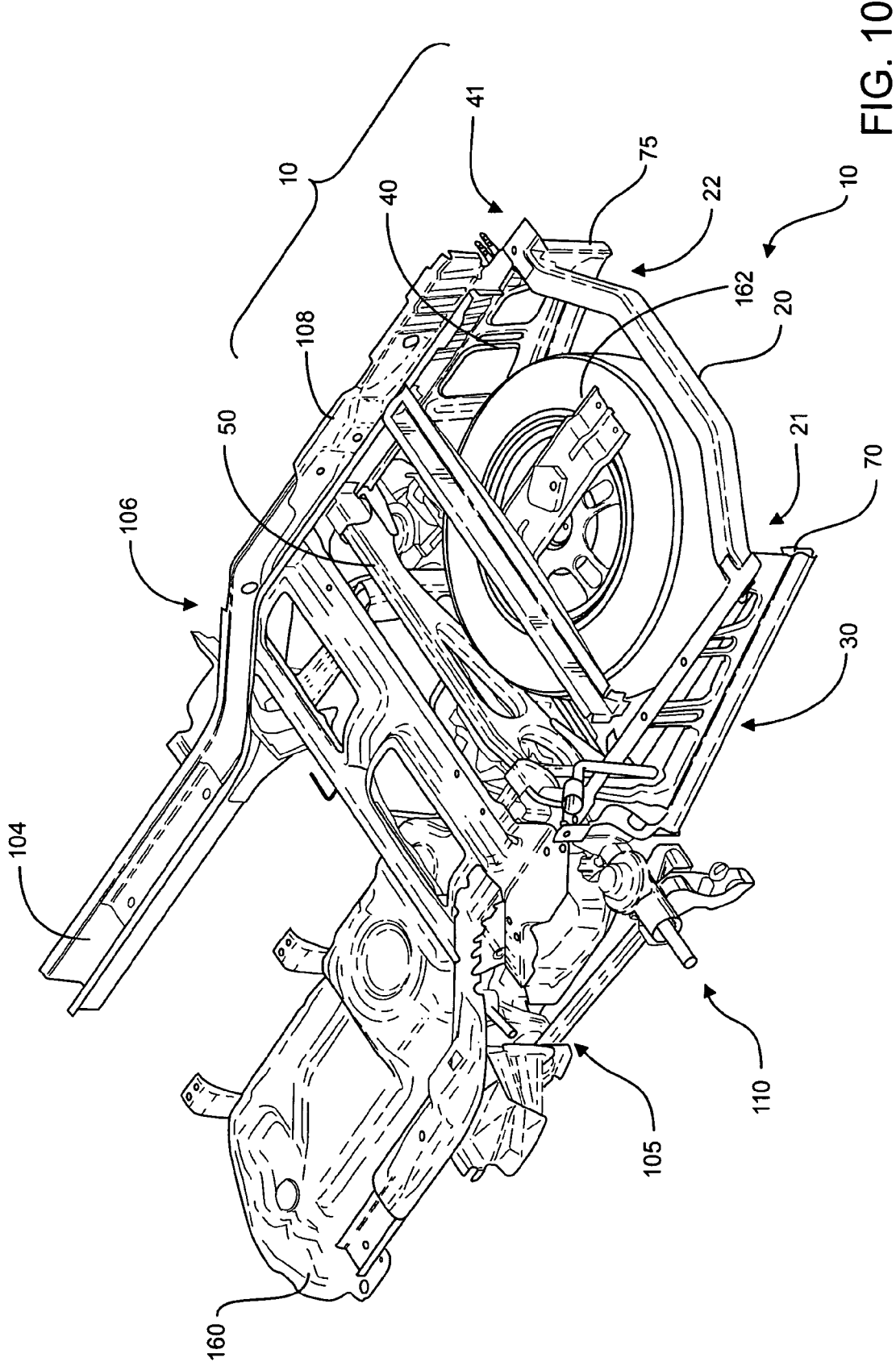
FIG. 10 illustrates an isometric view of an exemplary embodiment of the force redistributing system in relation to a tire and a fuel system in accordance with the present invention.

FIG. 10 illustrates an isometric view of an exemplary embodiment of the force redistributing system 9 in relation to a tire 162 and a fuel tank 160 in accordance with the present invention. The apparatus 10 of the force redistributing system 9 encircles the tire 162 and is aft of the rear axle system 110. The fuel tank 160 is fore of the rear axle system 110. In the event of a rear impact to a vehicle 5 having a force redistributing system 9, the tire 162 is held within the confines of the interior rectangular-shaped space of the apparatus 10. The apparatus 10 of the force redistributing system 9 reduces deformation of fuel tank 160 if the fuel tank 160 is located forward of the rear axle system 110.

In one embodiment, a fuel tank 160 is located aft of the rear axle system 110 between the rear rails 107 and 108. In this case, the fuel tank has different proportions from the fuel tank illustrated in FIG. 10 as is understandable to one skilled in the art.

Figure 11:
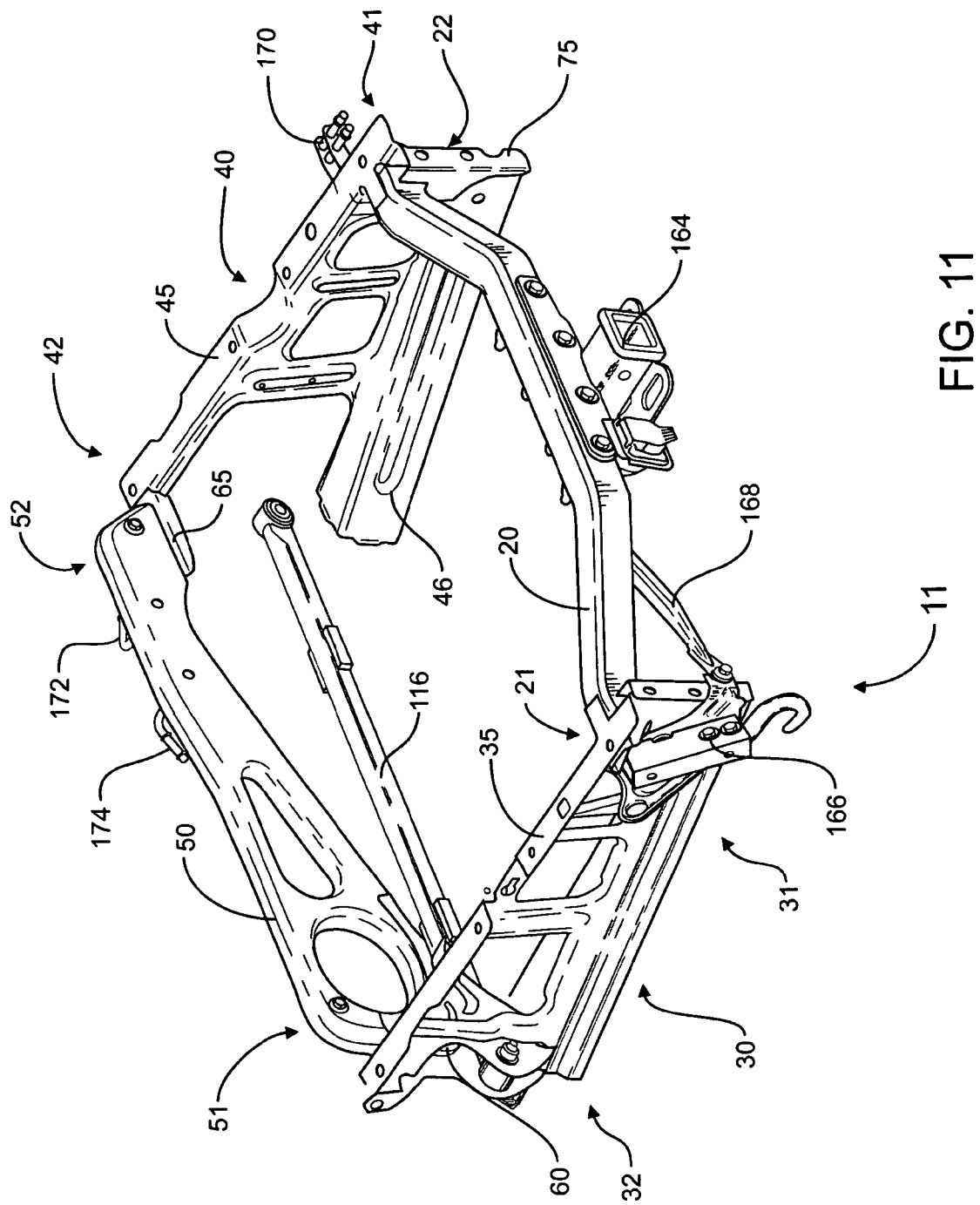
FIG. 11 illustrates an isometric view of an exemplary embodiment of a portion of the force redistributing system having peripheral attachments in accordance with the present invention.

FIG. 11 illustrates an isometric view of an exemplary embodiment of an apparatus 11 of the force redistributing system 9 having peripheral attachments in accordance with the present invention. The apparatus 11 includes apparatus 10 of FIGS. 1 and 2 as well as peripheral attachments 164, 166, 168, 170, 172 and 174. The apparatus 11 of the force redistributing system 9 is secured within the rear portion of the body of the vehicle 5. The attachments required to secure or stabilize other vehicle systems, such as exhaust system, towing system, fuel system and the like, can be attached to the apparatus 11 without compromising the integrity and functionality of the force redistributing system 9. The packaging of the vehicle system being supported determines the location and shape of the attachments. Some exemplary attachments are illustrated in FIG. 11 but other attachments are possible as is understandable by one skilled in the art.

An exhaust system hanger includes attachments 170, 172, and 174, which are operable to support the exhaust system (not shown) for vehicle 5. Attachments 172 and 174 are elongated hooks located on a frontward surface of the second cross car member 50. Attachment 170 is located between the second outer member 45 of second side load distributor 40 and the external body of the passenger side of the vehicle 5. The exhaust system hanger is operably attached to the force redistributing system 9 to connect the force redistributing system 9 to exhaust system components.

A hitch receiver attachment 164 is secured to the first cross-car member 20 with the hitch opening facing rearward from the rear of the vehicle 5. A brace 168 connects the hitch attachment receiver 164 to a towing bracket attachment 166. The towing bracket attachment 166 is attached to the first side load distributor 30 and positioned between the first outer member 35 of first side load distributor 30 and the external body of the driver side of the vehicle 5. The towing bracket attachment 166 and hitch receiver attachment 164 can be used to tow or pull a vehicle behind the vehicle 5.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A force redistributing system operably attached to a vehicle, the system comprising:
   a first cross-car member;
   first and second side load distributors, parallel to and spaced apart front each other attached at respective first ends to opposing ends of the first cross-car member;
   a second cross-car member having opposing ends attached to second ends of the first and second side load distributors,
   a pair of longitudinally extending vehicle rails positioned in an underbody of the vehicle, each rail includes a rear rail section, a rail kick-up positioned forward of an axis of rotation of rear wheels of the vehicle and a mid-rail section disposed forwardly of the kick-up, wherein the first and the second side load distributors and the second cross-car member are operably attached to the rear rail sections,
   wherein an upper force distribution path is defined that includes the rear rail sections and a lower force distribution path is defined that includes the first and second side load distributors and a rear axle system carrying the rear vehicle wheels and that is connected to at least one of the pair of mid-rail sections and the pair of rail kick-ups,
   wherein the system establishes cross vehicle loading of force from a rear impact against the second cross-car member, and
   wherein the force front the rear impact on the vehicle is transferred via the second cross-car member along the upper force distribution path and the lower force distribution path to a body-point that is forward of the rail kick-up.

2. The system of claim 1, wherein the first side load distributor includes a first outer member and a first inner member, wherein the second side load distributor includes a second outer member and a second inner member and wherein a portion of one of the rear rail sections overlap a top edge of the first side load distributor and is attached thereto and a portion of the other one of the rear rail sections overlap a top edge of the second side load distributor and is attached thereto.

3. The system of claim 2, wherein the first outer member and the second outer member operably connect the first cross-car member to rear rail sections of the vehicle providing a load path therebetween.

4. The system of claim 3, wherein the first inner member and the second inner member direct the force to chassis components to preserve rear door openings and to stabilize a rear portion of a vehicle underbody.

5. The system of claim 3, wherein each one of the outer and inner members of the first and second side load distributors has a rear end disposed toward a rear of the vehicle and a front end disposed in line with and adjacent an impact target zone portion of the rear axle system that defines part of the lower force distribution path.

6. The system of claim 2, wherein the top edge of the first side load distributor and a bottom edge of one of the first outer member and first inner member of the first side load distributor and the top edge of the second side load distributor and a bottom edge of one of the second outer member and second inner member are each disposed at an acute angle, θ, of between about 5° and 15°.

7. The system of claim 1, wherein the second cross-car member operably connects to rear rail sections of a rear underbody to secure the first cross-car member and the first and second side load distributors to the vehicle.

8. The system of claim 1, wherein a first fore-bridge bracket interconnects the second cross-car member, a first inner member of the first side load distributor, and a first outer member of the first side load distributor to the vehicle.

9. The system of claim 1, wherein a second fore-bridge bracket connects a second outer member of the second side load distributor to the second cross-car member.

10. The system of claim 2, wherein there is an upper and lower force distribution path for each one of the first and second side load distributors with (a) there being a first lower force distribution path defined by the first side load distributor and a first upper force distribution path defined by the rear rail with the rear rail overlapping the first side load distributor and (b) there being a second lower force distribution path defined by the second side load distributor and a second upper force distribution path defined by the rear rail with the rear rail overlapping the second side load distributor, wherein the rear impact is an off-center rear impact, and wherein the first cross-car member transfers a first portion of the off-center rear impact force to the first side load distributor with the first portion of the force transferred between the first upper and lower force distribution paths and a second portion of the off-center rear impact force to the second side load distributor with the second portion of the force transferred between the second upper and lower force distribution paths.

11. The force redistributing system of claim 1 wherein the rear axle system is operably connected to each one of the vehicle rails by a link with the lower force distribution path extending therethrough.

12. The force redistributing system of claim 11 wherein each link comprises a control arm connected to part of the rear axle system and connected to one of the mid-rail sections.

13. A force redistributing system operably attached to a vehicle, the system comprising:
 a first cross-car member;
 first and second side load distributors, parallel to and spaced apart from each other attached at respective first ends to opposing ends of the first cross-car member with opposing ends of the first cross-car member attached respectively to the first and second side load distributors; and
 a second cross-car member having opposing ends attached to second ends of the first and second side load distributors,
 vehicle rails comprising rear rails positioned in a rear underbody of the vehicle, each rear rail includes a kick-up positioned forward of an axis of rotation of rear wheels of the vehicle, wherein the first and the second side load distributors and the second cross-member are operably attached to the rear rails with one of the rear rails overlapping a top edge of one of the first and second side load distributors and another one of the rear rails overlapping a top edge of the other one of the first and second side load distributors,
 wherein an upper path includes the rear rails and a lower path includes the first and second side load distributors,
 wherein the system establishes cross vehicle loading of force from a rear impact,
 wherein the force from the rear impact on the vehicle is transferred along the upper path and the lower path to a body-point that is forward of the rail kick-up,
 wherein the first side load distributor includes a first outer member and a first inner member,
 wherein the second side load distributor includes a second outer member and a second inner member, and
 wherein the top edge of the first side load distributor and a bottom edge of one of the first outer member and first inner member of the first side load distributor and the top edge of the second side load distributor and a bottom edge of one of the second outer member and second inner member each subtend an angle, θ, of between about 5° and 15°.

14. The system of claim 13, wherein the lower path includes the first and second side load distributors and a rear axle system that carries the wheels and which is connected to mid-rails disposed in communication with the kick-ups.

15. The system of claim 14, wherein a first rear bridge bracket operably interconnects a first end of the first cross-car member, the first outer member, and the first inner member, and
 wherein a second rear bridge bracket operably interconnects a second end of the first cross-car member, the second outer member, and the second inner member.

16. The system of claim 14, wherein the first cross-car member has a geometric shape suitable for trailer hitch adaptation, and wherein the first cross-car member is operable as a lateral load distributor for offset and symmetric loading of the force from the rear impact.

17. The force redistributing system of claim 14 wherein the rear axle system is operably connected to each one of the vehicle rails by a control arm link with the lower force distribution path extending therethrough.

18. A force redistributing system in combination with a chassis of a vehicle comprising:
 (a) a vehicle chassis comprising (1) a pair of laterally spaced apart, longitudinally extending, and elongate frame rails that each includes a mid-rail section disposed towards a front of the vehicle, a rear rail portion disposed towards a rear of the vehicle, and a rail kick-up disposed between the mid-rail section and rear rail section, and (2) a rear axle arrangement carried by the frame rails; and
 (b) a force redistributing system comprising:
  (1) a pair of laterally spaced apart and generally longitudinally extending side load distributors each comprised of an elongate lower beam having a forwardly disposed end and an upper elongate rail mount; and
  (2) a pair of spaced apart and generally transversely extending cross-braces extending between the pair of side load distributors with one of the cross-braces disposed adjacent a rear of the pair of the side load distributors and communicating a rear impact force to at least the pair of side load distributors;
 wherein the rear section of one of the pair of frame rails overlaps one of the upper rail mounts of one of the pair of side load distributors and is attached thereto and the rear section of the other one of the pair of frame rails overlaps the other one of the upper elongate rail mounts and is attached thereto;

wherein the forwardly disposed end of each one of the side load distributors is located adjacent a corresponding impact target zone of the rear axle arrangement; and wherein force from a rear impact is communicated via the rear cross-brace (i) to each one of the rear rail sections that each defines an upper force distribution path and (ii) to the lower beam of each one of the side load distributors that each defines a lower force distribution path when the lower beam impacts the corresponding target zone of the rear axle arrangement.

19. The force redistributing system and vehicle chassis combination of claim 18 wherein the rear axle arrangement is operably connected to each one of the vehicle rails by a link through which one of the lower force distribution paths extend.

* * * * *